(12) United States Patent
Fahs et al.

(10) Patent No.: US 8,850,436 B2
(45) Date of Patent: Sep. 30, 2014

(54) OPCODE-SPECIFIED PREDICATABLE WARP POST-SYNCHRONIZATION

(75) Inventors: Brian Fahs, Los Altos, CA (US); Ming Y. Siu, Santa Clara, CA (US); Robert Steven Glanville, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 475 days.

(21) Appl. No.: 12/892,887

(22) Filed: Sep. 28, 2010

(65) Prior Publication Data

US 2011/0078690 A1    Mar. 31, 2011

Related U.S. Application Data

(60) Provisional application No. 61/246,484, filed on Sep. 28, 2009.

(51) Int. Cl.
```
G06F 9/46      (2006.01)
G06F 9/38      (2006.01)
G06F 9/30      (2006.01)
```

(52) U.S. Cl.
CPC .............. *G06F 9/46* (2013.01); *G06F 9/3851* (2013.01); *G06F 9/30185* (2013.01); *G06F 9/3887* (2013.01); *G06F 9/30072* (2013.01); *G06F 9/30087* (2013.01)
USPC .......... 718/102; 718/100; 718/108; 712/220; 712/228; 712/233; 712/234

(58) Field of Classification Search
None
See application file for complete search history.

(56) References Cited

U.S. PATENT DOCUMENTS

| | | | |
|---|---|---|---|
| 7,015,913 B1* | 3/2006 | Lindholm et al. | 345/501 |
| 7,353,369 B1* | 4/2008 | Coon et al. | 712/234 |
| 7,477,255 B1* | 1/2009 | Lindholm et al. | 345/501 |
| 7,512,950 B1* | 3/2009 | Marejka | 718/106 |
| 7,533,237 B1* | 5/2009 | Nordquist | 711/170 |
| 7,543,136 B1* | 6/2009 | Coon et al. | 712/228 |
| 7,584,342 B1* | 9/2009 | Nordquist et al. | 712/22 |
| 7,617,384 B1* | 11/2009 | Coon et al. | 712/220 |
| 7,761,697 B1* | 7/2010 | Coon et al. | 712/233 |
| 7,788,468 B1* | 8/2010 | Nickolls et al. | 712/22 |
| 7,805,573 B1* | 9/2010 | Coon | 711/132 |

(Continued)

*Primary Examiner* — Emerson Puente
*Assistant Examiner* — Hiren Patel
(74) *Attorney, Agent, or Firm* — Patterson & Sheridan, LLP

(57) ABSTRACT

One embodiment of the present invention sets forth a technique for performing a method for synchronizing divergent executing threads. The method includes receiving a plurality of instructions that includes at least one set-synchronization instruction and at least one instruction that includes a synchronization command, and determining an active mask that indicates which threads in a plurality of threads are active and which threads in the plurality of threads are disabled. For each instruction included in the plurality of instructions, the instruction is transmitted to each of the active threads included in the plurality of threads. If the instruction is a set-synchronization instruction, then a synchronization token, the active mask and the synchronization point is each pushed onto a stack. Or, if the instruction is a predicated instruction that includes a synchronization command, then each active thread that executes the predicated instruction is monitored to determine when the active mask has been updated to indicate that each active thread, after executing the predicated instruction, has been disabled.

22 Claims, 8 Drawing Sheets

(56) References Cited

U.S. PATENT DOCUMENTS

| | | |
|---|---|---|
| 7,861,060 B1 * | 12/2010 | Nickolls et al. .................. 712/22 |
| 7,877,585 B1 * | 1/2011 | Coon et al. .................... 712/233 |
| 8,055,856 B2 * | 11/2011 | Coon et al. .................... 711/152 |
| 8,082,425 B2 * | 12/2011 | Sudhakar et al. ............. 712/226 |
| 8,108,659 B1 * | 1/2012 | Le Grand ...................... 712/225 |
| 8,381,203 B1 * | 2/2013 | Beylin et al. ................... 717/150 |
| 8,667,256 B1 * | 3/2014 | Coon et al. .................... 712/228 |
| 2005/0289329 A1 * | 12/2005 | Dwyer et al. .................. 712/234 |
| 2008/0010640 A1 * | 1/2008 | Foo ................................. 718/100 |
| 2009/0240890 A1 * | 9/2009 | Collard et al. ................ 711/125 |
| 2009/0240931 A1 * | 9/2009 | Coon et al. .................... 712/234 |
| 2011/0047556 A1 * | 2/2011 | Nishihara ..................... 718/106 |

* cited by examiner

OPCODE-SPECIFIED PREDICATABLE WARP POST-SYNCHRONIZATION

CROSS-REFERENCE TO RELATED APPLICATIONS

This application claims priority benefit to U.S. provisional patent application titled, "OPCODE-SPECIFIED, PREDICATABLE, WARP POST SYNCHRONIZATION" filed on Sep. 28, 2009 and having Ser. No. 61/246,484.

BACKGROUND OF THE INVENTION

1. Field of the Invention

The present invention generally relates to graphics processing and more specifically to a system and method for enabling predication of synchronization commands.

2. Description of the Related Art

Current graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process in parallel as much graphics data as possible throughout the different parts of the graphics pipeline. Graphics processors with SIMD (single-instruction multiple-data) architectures are designed to maximize the amount of parallel processing in the graphics pipeline. In a SIMD architecture, the same instruction is executed in parallel to process multiple data inputs. A single-instruction, multiple-thread ("SIMT") architecture provides greater flexibility than a SIMD architecture since threads in a group of threads (also referred to as a "warp") may follow different paths through a set of instructions to process multiple data inputs. A SIMD instruction specifies the execution and branching behavior of a single control thread controlling operations on a vector of multiple data inputs. In contrast, a SIMT instruction specifies the execution and branching behavior of one individual independent thread operating on its data inputs, and a SIMT architecture applies a SIMT instruction to multiple independent threads in parallel which are free to execute and branch independently. Conditional break and return instructions in which threads may branch independently are used for advanced control flow in order to improve processing efficiency. In particular, threads that execute a break or return may complete processing earlier than threads that do not execute the break or return. Threads that have diverged during the execution of conditional control flow instructions are then synchronized so that those threads are executed in parallel.

In current SIMT architectures, synchronization of divergent threads may be realized by appending a synchronization command to an instruction that each divergent thread is currently executing. For example, a first instruction denoted "instruction1" may specify a synchronization command by appending ".S" to the instruction, resulting in "instruction1.S." In this example, the synchronizing operation was performed before instruction1 execution and performed by the graphics processor regardless of any predication specified by the executing instruction. Such synchronization operations are costly and therefore decrease the performance of the SIMT architecture.

Accordingly, what is needed in the art is a SIMT architecture that allows predication of synchronization commands and performs the synchronizing operation after the instruction finishes executing.

SUMMARY OF THE INVENTION

One embodiment of the present invention sets forth a technique for performing a method for synchronizing divergent executing threads. The method includes receiving a plurality of instructions that includes at least one set-synchronization instruction and at least one instruction that includes a synchronization command, and determining an active mask that indicates which threads in a plurality of threads are active and which threads in the plurality of threads are disabled. For each instruction included in the plurality of instructions, the instruction is transmitted to each of the active threads included in the plurality of threads. If the instruction is a set-synchronization instruction, then a synchronization token, the active mask, and the synchronization point is each pushed onto a stack. Or, if the instruction is a predicated instruction that includes a synchronization command, then each active thread that executes the predicated instruction is monitored to determine when the active mask has been updated to indicate that each active thread, after executing the predicated instruction, has been disabled.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
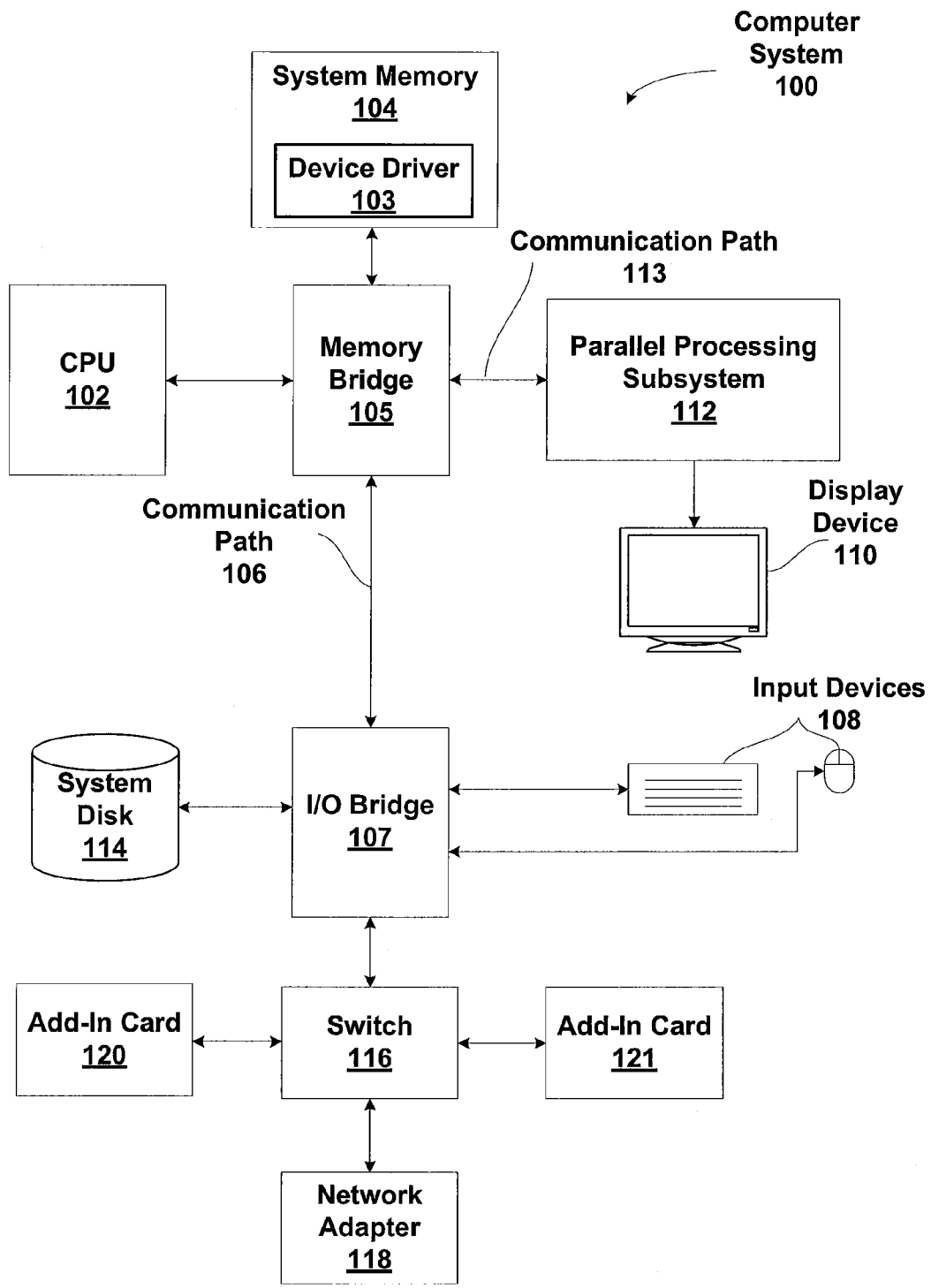
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
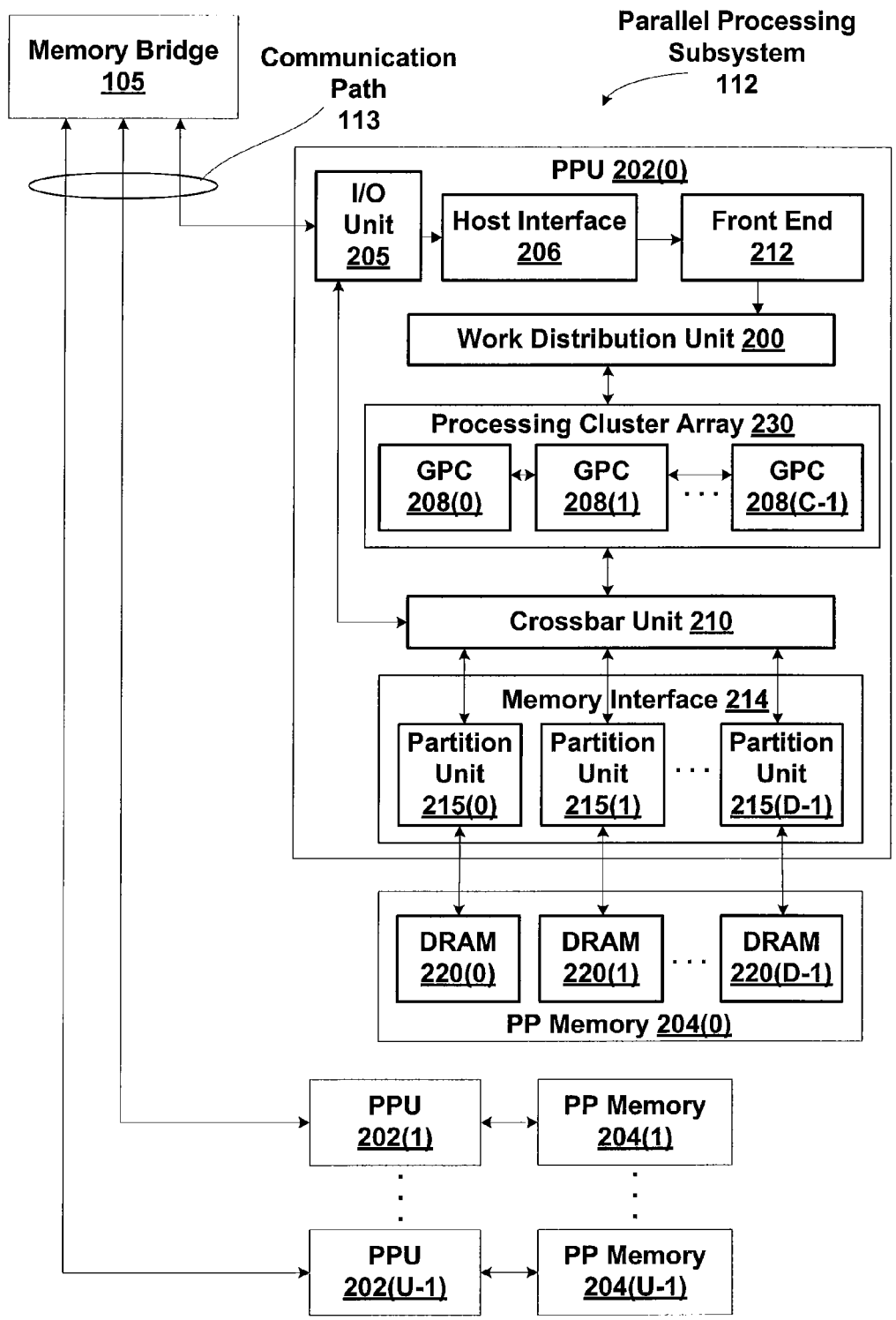
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
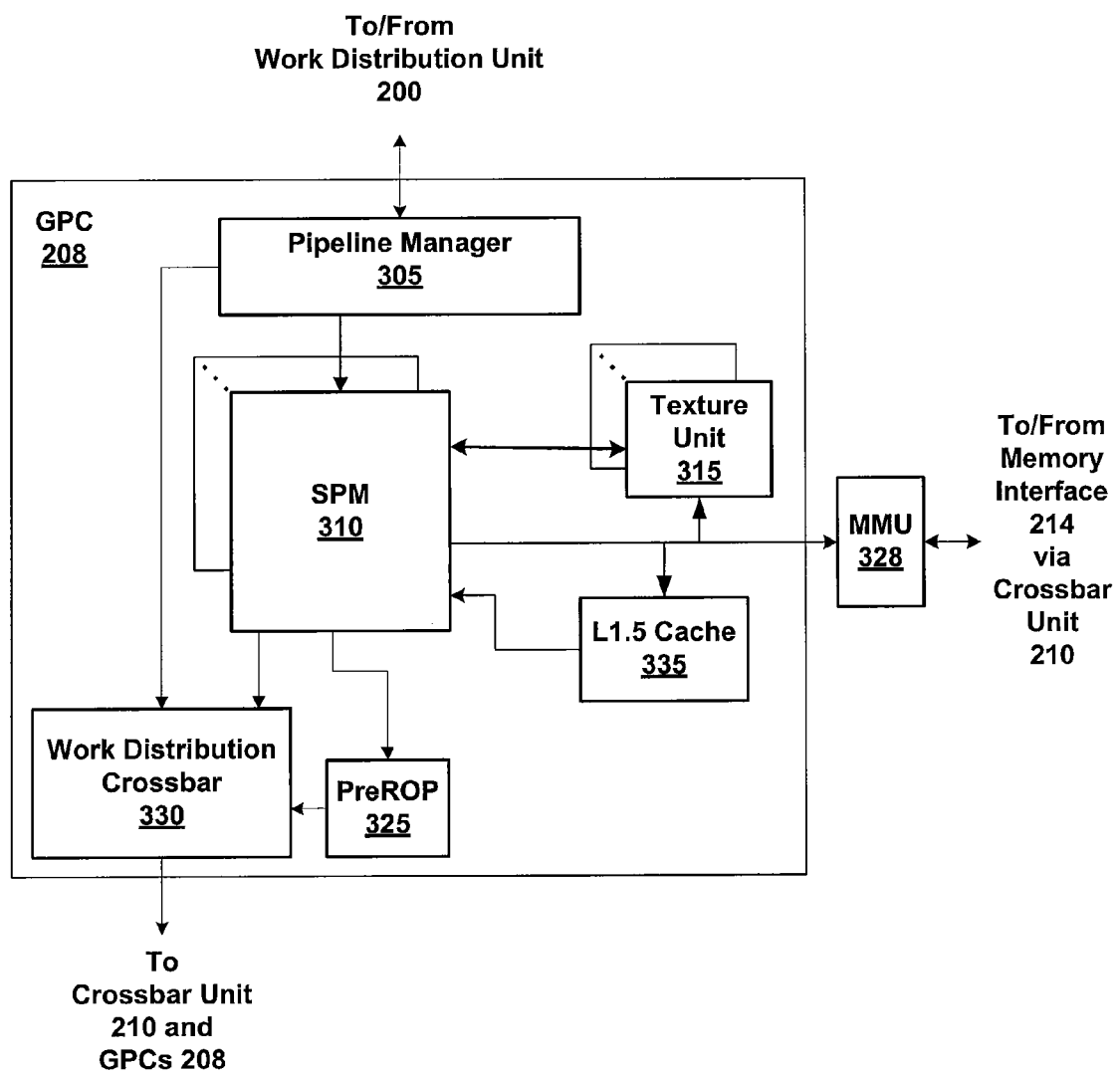
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
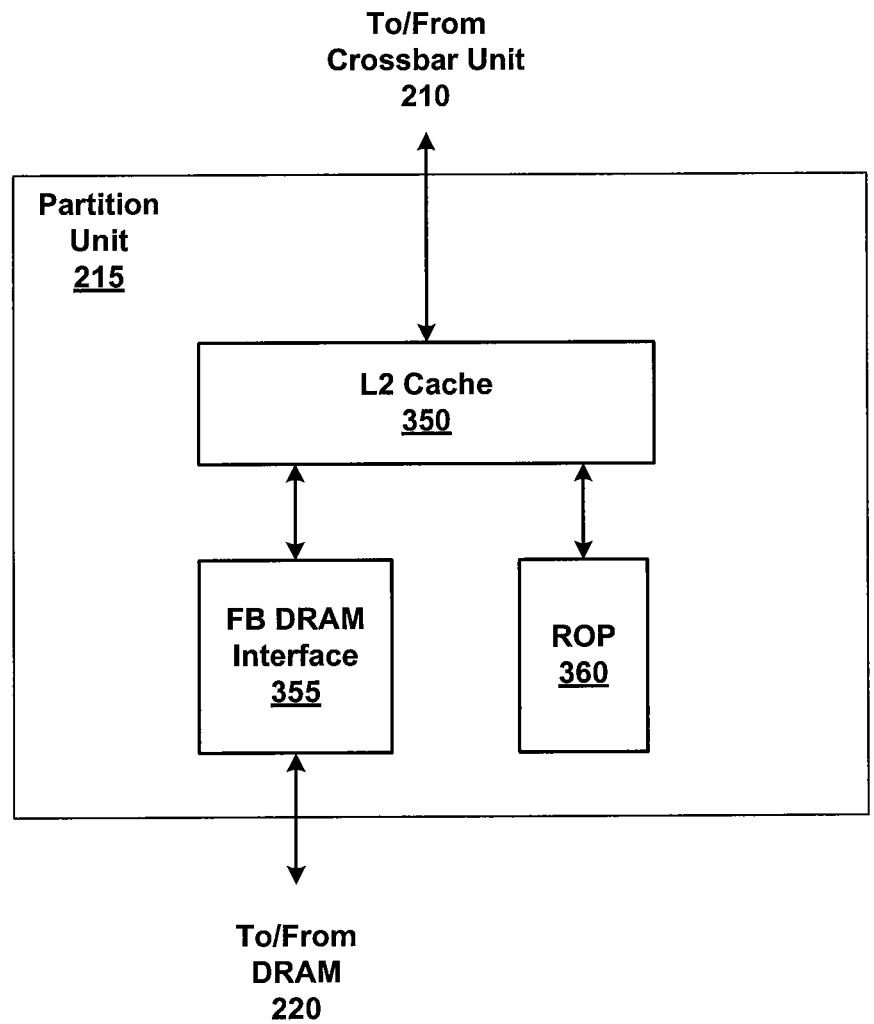
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of the thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
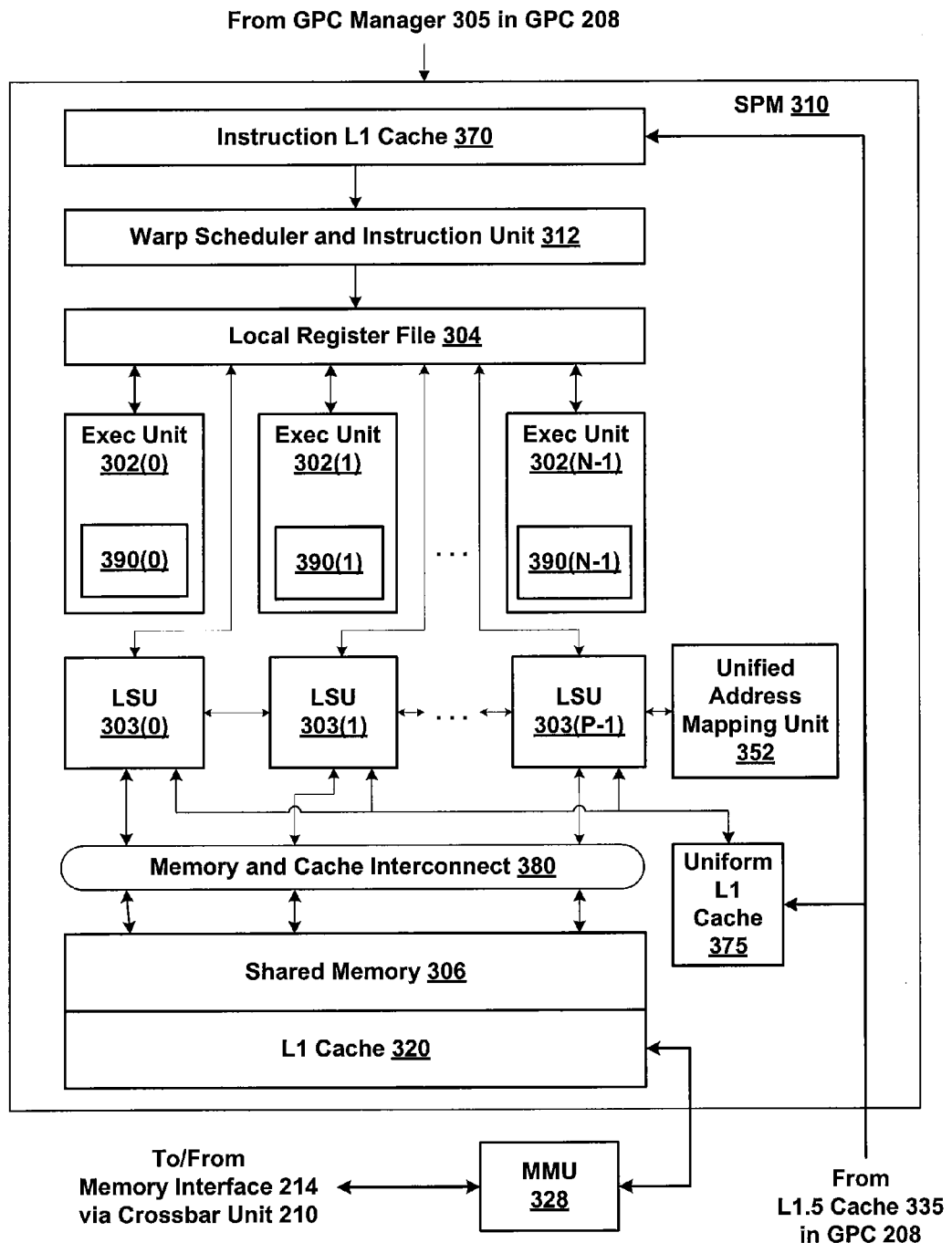
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Multithreaded Instruction Processing

Figure 4:
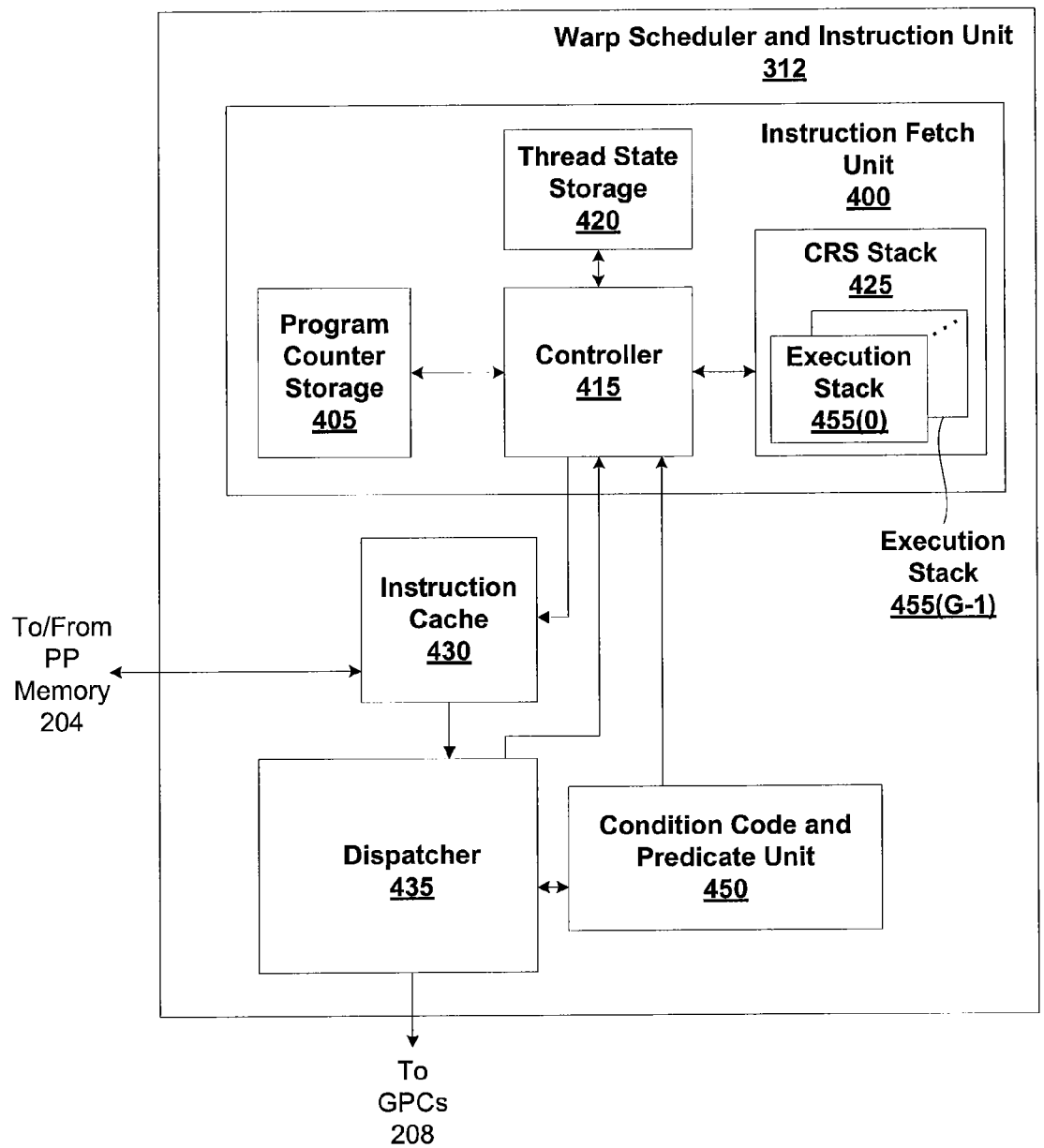
FIG. 4 is a more detailed block diagram of the warp scheduler and instruction unit for the parallel processing unit of FIG. 3C in accordance with one or more aspects of the present invention.

FIG. 4 is a block diagram of the warp scheduler and instruction unit 312, in accordance with one or more aspects of the present invention. Warp scheduler and instruction unit 312 includes an instruction fetch unit 400, instruction cache 430, dispatcher 435, and condition code unit 450. Instruction fetch unit 400 receives data to be processed and a program identifier corresponding to a program that should be used to process the data. Address registers 445 store address values that may be loaded and read by program instructions. There is a set of registers in address registers 445 for each thread in a thread group. In some embodiments of the present invention address registers 445 store 16 bit values and in other embodiments, address registers 445 store 32 bit values.

A program counter storage 405 stores the active program counter, indicating the next program instruction (INSTR) that should be executed for each thread group. When G=24, program counter storage 405 stores 24 active program counters. Similarly, thread state storage 420 stores an active mask for each thread group, where each bit of the active mask corresponds to an integer number of the processing engines executing within GPC 208. Therefore, the number of bits in the active mask is the number of threads in a thread group. Thread state storage 420 also stores a disable mask for each thread group. The disable mask includes a flag for each one of the threads in the thread group. The flag indicates if a thread is enabled, disabled for the processing of a conditional return instruction, disabled for the processing of a conditional break instruction, or if the thread has exited the program.

CRS (call, return, synchronization) stack 425 includes an execution stack for each thread group, shown as execution stacks (0) through (G−1) in FIG. 4. The execution stacks are used during control instruction processing to push and pop tokens that include state information, e.g., token type, token program counter, and token mask. In some embodiments of the present invention, CRS stack 425 may spill entries to PP memory 204 for any execution stacks 455 that overflow and restore spilled entries when space is available in CRS stack 425. Controller 415 pushes and pops entries from CRS stack 425 as control instructions are executed. In one embodiment, there are many types of control instructions, including conditional branch instructions, call instructions, PreBreak instructions, PreReturn instructions, conditional return instructions, synchronization commands (.S), and conditional break instructions. Alternative embodiments may include more or fewer types of control instructions as well as different types of control instructions.

Controller 415 provides an active program counter and active mask for a thread group to instruction cache 430. Instruction cache 430 obtains the instruction corresponding to the active program counter and outputs the instruction and active mask to dispatcher 435. Instruction cache 430 reads the instructions from PP memory 204 as needed, using caching techniques known to those skilled in the art. Controller 415 receives control information from condition code unit 450 via control information 440 when a control instruction is executed. The control information includes a token type indicating the type of control instruction, a stack unwind signal, and other data needed to push tokens onto CRS stack 425 and update the active mask and disable mask for the thread group.

Dispatcher 435 decodes the instruction and outputs conditional data for any conditional control instructions (conditional branch, conditional break, and conditional return, etc.) to condition code unit 450. The conditional data includes the condition test and the comparison value (specified by the control instruction) to which the condition code is applied.

The comparison value may be computed during execution of the program and each thread in the thread group may have a comparison value. Therefore, some threads may produce a true result while others produce a false result, when the condition test is evaluated. When one or more active threads in a warp are executing a conditional control flow instruction and produce a different conditional result than other active threads, the threads diverge and CRS stack 435 is used to store a token including an active mask and program counter for the side of the control flow instruction that will be executed after a first side of the control flow instruction has completed execution.

In addition to the conditional data, dispatcher also outputs the control instruction (call, break, return, branch, or the like), any target program counter (address) specified by the instruction, and active mask to condition code unit 450. Condition code unit 450 determines a "taken" mask based on the active mask that is included in the control information output to controller 415 by condition code unit 450. Specifically, condition code unit 450 uses the condition test result to determine a "taken mask" that indicates the active threads which evaluate to TRUE for the condition test specified by the instruction. Bits of the taken mask for threads in the thread group that indicate a true comparison test result are cleared. The active mask and taken mask may be used by controller 415 to update the disable mask. When a function call is performed with two or more threads having different function pointers, the function call is serialized to execute the threads specifying each unique function pointer and the taken mask is used to indicate the active threads for each unique function pointer.

Condition code unit 450 outputs the taken mask and token type to controller 415 via control information 440. When a target program counter is specified by a call or branch control instruction, the taken program counter is output by condition code unit 450 to controller 415 via control information 440. The token type indicates the type of control instruction that was executed to produce the disable mask. Such token types may include set synchronization (SSY), call, diverge, and break. Note, that when a control instruction for a thread is in-flight, i.e., output by controller 415 and not yet received by controller 415 via control information 440, another instruction for the same thread should not be output by controller 415.

Other instructions (non-control instructions), received by dispatcher 435 are queued for output to the processing engines executing within GPC 208. Dispatcher 435 may be configured to output instructions based on the availability of (computational or storage) resources that are needed to process the instruction. In some embodiments of dispatcher 435, a scoreboarding scheme is used to track resource availability and determine which instructions can be output to the processing engines executing within GPC 208. When the processing engines executing within GPC 208 receive an instruction, a read request is generated to obtain any operands that are needed to execute the instruction and the read request is output to LRF or shared memory. The instruction is then processed by the processing engines executing within GPC 208 when the operands have been obtained.

Opcode-Specified Predicatable Warp Post-Synchronization

Embodiments of the present invention provide enhanced designs and implementations of warp synchronizing commands, denoted ".S." TABLE 1 sets forth pseudo-code for an instruction sequence that incorporates embodiments of the invention described herein.

TABLE 1

| High-level Instruction Sequence for Program #1 |
| --- |
| if (<condition>) { |
|     x++; |
| } |
| else { |
|     foo( ); |
|     x--; |
| } |
| Assembly-Level Instruction Sequence for Program #1 |
| (1)    SSY IF_ELSE_DONE; |
| (2)    @P0 IADD.S R0, R0, 1; |
| (3)    CAL foo; |
| (4)    IADD.S R0, R0, -1; |
|     IF_ELSE_DONE: |
| (5)    <remaining instructions> |

The high-level instruction sequence for program #1 sets forth instructions to increment a variable x when the <condition> is met. Conversely, if the same condition is not met, the function foo( ) is executed and, upon completion of execution of the foo( ) function, the variable x is decremented.

The assembly-level instruction sequence for program #1 represents an instruction sequence that mirrors the parameters of the high-level instruction sequence for program #1. As described above, the assembly-level instruction sequence may be stored in the instruction cache 430, where the instruction fetch unit 400 manages an active program counter that enables proper execution of the assembly-level instruction sequence.

Consider an example in which a warp that includes thirty-two threads executes the assembly-level instruction sequence, where each of the thirty-two threads is active. Accordingly, a GPC 208 would include thirty two processing engines that are each configured to execute one of the thirty-two threads included in the warp. Further, the active mask described above in FIG. 4 would include 32-bits, where each bit corresponds to the active/disabled ('1' or '0', respectively) state of one of the thirty-two threads. In this example, the first instruction "SSY IF_ELSE_DONE" causes the warp scheduler and instruction unit 312 to push a set synchronization (SSY) token onto the CRS stack 425. The pushed SSY token is accompanied by a copy of the active mask and the sync-up address (in this case, the location of label IF_ELSE_DONE) which are each used to effectively restore the original state of execution upon completion of divergent execution paths caused by conditional blocks (such as IF/ELSE blocks). Upon pushing the SSY token, a copy of the active mask and the sync-up address onto the CRS stack 425, the warp scheduler and instruction unit 312 increments the active program counter and proceeds to the second instruction included in the assembly-level instruction sequence.

As shown, the second instruction specifies "P0" which, in this example, references a 1-bit register that corresponds to each thread included in the warp and stores a Boolean value that is set according to a TRUE/FALSE result of a previously-executed conditional statement (corresponding to the result of testing the condition <condition> in the high level instruction sequence). The ampersand symbol appended to "P0" causes each thread to execute the IADD instruction only if the corresponding P0 1-bit register includes a value of TRUE. The IADD instruction references "R0, R0, 1" which, also in this example, references an n-bit register that corresponds to each thread included in the warp and stores a particular value, such as an integer. The "R0, R0, 1" specified in the IADD instruction causes each thread to increment the value stored in the corresponding register R0.

Each thread included in the warp receives the second instruction for processing and begins execution by referencing the Boolean value included in the corresponding P0 register. Consider an example where each of the P0 registers that correspond to threads 0-15 of the thirty-two threads store a value of TRUE, while the P0 registers that correspond to threads 16-31 of the thirty-two threads store a value of FALSE. In this example, threads 0-15 execute the IADD instruction, while threads 16-31 do not execute the IADD instruction.

When each of threads 0-15 completes the execution of the IADD instruction, each of threads 0-15 also executes the ".S" synchronization command that follows. Execution of the ".S" synchronization command causes each of threads 0-15 to update their corresponding bit in the active mask to a value of '0,' as described above in conjunction with FIG. 4. This update to the active mask causes each of threads 0-15 to be subsequently disabled so that they appropriately do not execute the third and fourth instructions included in the assembly-level instruction sequence.

Next, each of the remaining active threads—threads 16-31—receive the third instruction for processing and accordingly executes the arbitrary function foo( ). In this case, since no synchronization command ".S" follows foo( ) no update to the active mask is performed by threads 16-31. Instead, when each thread 16-31 completes execution of function foo( ) the active program counter is incremented, causing each of the threads 16-31 to receive the fourth instruction included in the assembly-level instruction sequence.

As shown in TABLE 1, the fourth instruction specifies "IADD.S R0, R0, −1," which causes each of threads 16-31 to decrement the value stored in their corresponding register R0. When threads 16-31 complete the IADD instruction, each of threads 16-31 executes the ".S" synchronization command which causes each of the threads 16-31 to update their corresponding bit included in the active mask to a value of '0,' as described above. Thus, upon completion of the fourth instruction, the thirty-two bits included in the active mask are all set to a value of '0,' indicating that each of the threads 0-31 included in the warp are inactive.

Upon this indication, the warp scheduler and instruction unit 312 pops the SSY token, copy of the active mask and the sync-up address off of the CRS stack 425. The active mask is set to the copy of the active mask, and the program counter is set to the sync-up address that is popped from the CRS stack 425, which refers to the IF_ELSE_DONE statement included in the assembly-level instruction sequence. Thus, the active mask is restored to a thirty-two bit value with each bit set to '1,' and each of the thirty-two threads included in the warp commences execution of the fifth instruction.

Figure 5A:
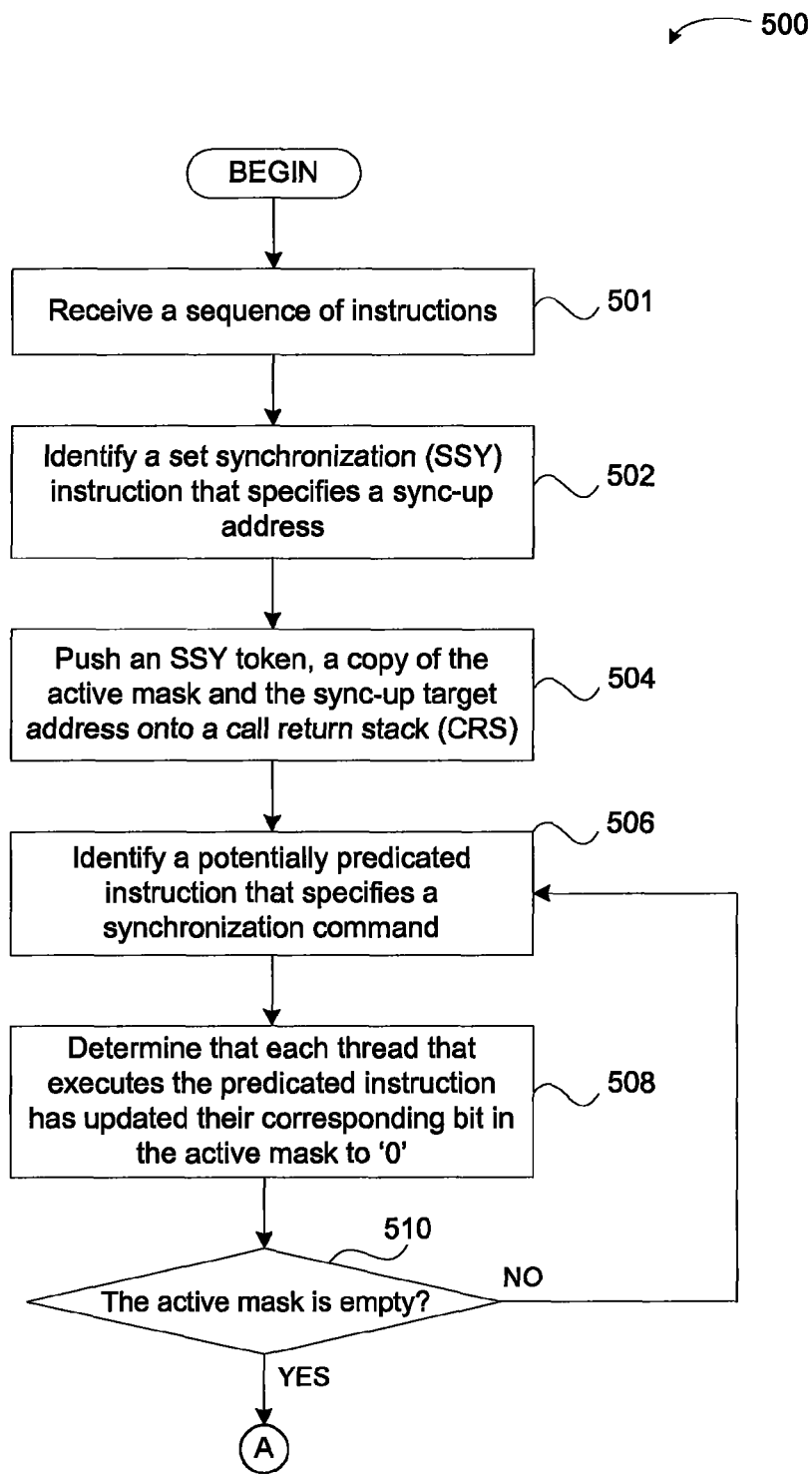
FIGS. 5A-5B depict a flow diagram of method steps for predicating synchronization commands in accordance with one or more aspects of the present invention.
Figure 5B:
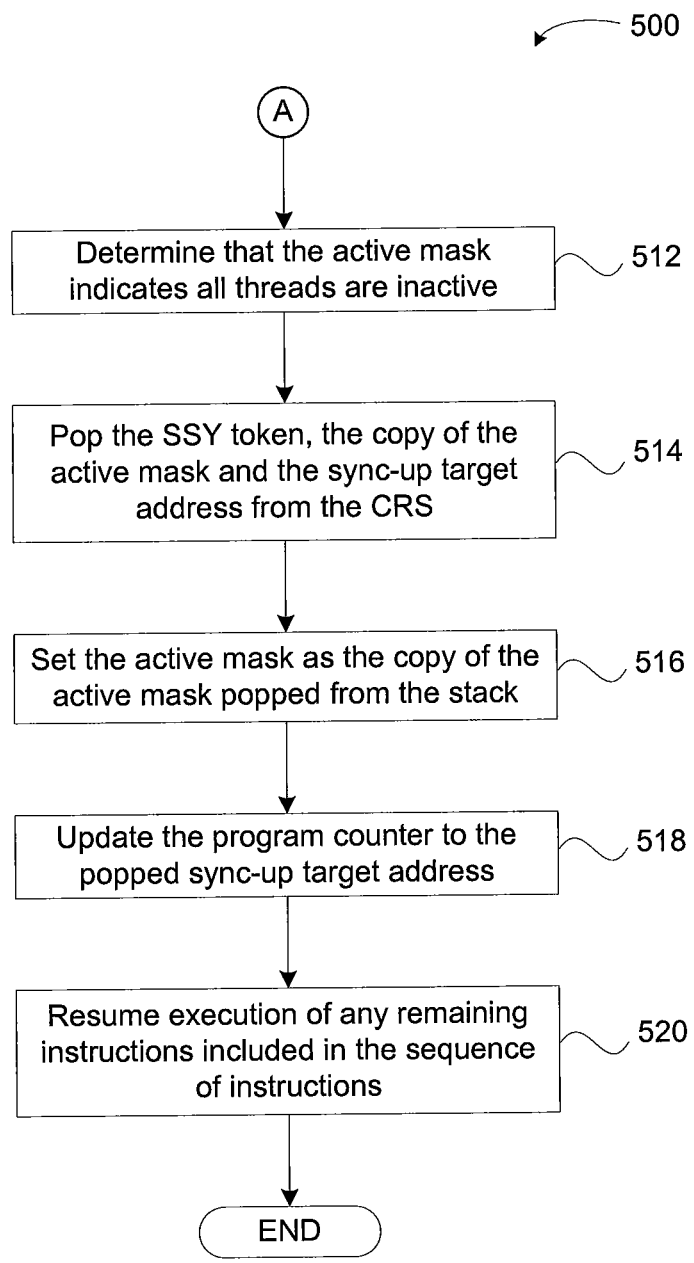

FIGS. 5A-5B depict a flow diagram of method steps for predicating synchronization commands in accordance with one or more aspects of the present invention. Although the method steps are described in conjunction with the systems for FIGS. 1-4, persons skilled in the art will understand that any system configured to perform the method steps, in any order, is within the scope of the present invention.

The method 500 begins at step 501, where the warp scheduler and instruction unit 312 receives a sequence of instructions. At step 502, the warp scheduler and instruction unit 312 identifies a set synchronization (SSY) instruction that specifies a sync-up address, as described above with respect to the assembly-level instruction sequence included in TABLE 1.

At step 504, the warp scheduler and instruction unit 312 pushes an SSY token, a copy of the active mask and the sync-up target address onto the call return stack (CRS) 425. In one embodiment, each of the SSY token, the copy of the active mask and the sync-up target address are grouped into a single data component to minimize the number of push and pops made to the CRS stack 425, thereby enhancing memory operation efficiency.

At step 506, the warp scheduler and instruction unit 312 identifies a potentially predicated instruction that specifies a synchronization command. As previously described, each of the active threads processes the instruction and determines, based on a pre-determined Boolean value, whether to execute the instruction. In one example, assume that thirty-two threads are actively executing within a GPC 208. Thus, anywhere from zero to thirty-two of the thirty-two threads might execute the instruction and, for any threads that do execute the instruction, the active mask is updated.

At step 508, the warp scheduler and instruction unit 312 determines that each thread that executes the predicated instruction has updated their corresponding bit in the active mask to '0.' At step 510, the warp scheduler and instruction unit 312 determines whether the active mask is empty. If, at step 510, the warp scheduler and instruction unit 312 determines that the active mask is not empty, then the method 500 proceeds back to step 506, described above. However, if the warp scheduler and instruction unit 312 determines that the active mask is empty, then the method 500 proceeds to step 512, where the warp scheduler and instruction unit 312 determines that the active mask indicates all threads are inactive.

At step 514, the warp scheduler and instruction unit 312 pops the SSY token, the copy of the active mask and the sync-up target address from the CRS. At step 516, the warp scheduler and instruction unit 312 sets the active mask as the copy of the active mask popped from the stack in step 514, thereby restoring the active mask to a state that existed prior to the SSY instruction identified in step 502.

At step 518, the warp scheduler and instruction unit 312 updates the program counter to the popped sync-up target address. At step 520, the warp scheduler and instruction unit 312 resumes execution of any remaining instructions included in the sequence of instructions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for synchronizing divergent executing threads, the method comprising:
   receiving a plurality of instructions that includes at least one set-synchronization instruction that references a synchronization point within the plurality of instructions and at least one instruction that includes a synchronization command;
   determining an active mask that indicates which threads in a plurality of threads are active and which threads in the plurality of threads are disabled;
   for each instruction included in the plurality of instructions, transmitting the instruction to each of the active threads included in the plurality of threads;
   when an instruction included in the plurality of instructions is a set-synchronization instruction that references a synchronization point within the plurality of instructions, then pushing onto a stack a synchronization token, the active mask and the synchronization point; and
   when an instruction included in the plurality of instructions is a predicated instruction that includes a synchronization command, then monitoring each active thread that executes the predicated instruction to determine when the active mask has been updated to indicate that each active thread, after executing the predicated instruction, has been disabled.

2. The method of claim 1, wherein each instruction in the plurality of instructions corresponds to a different value of a program counter.

3. The method of claim 2, wherein the program counter is incremented each time a different instruction is transmitted to the active threads.

4. The method of claim 1, wherein, when the active mask indicates that all threads included in the plurality of threads are disabled, further comprising the step of popping the synchronization token, the active mask and the synchronization point from the stack.

5. The method of claim 4, further comprising the steps of setting the active mask to the active mask popped from the stack, and setting the program counter to a value that references the synchronization point.

6. The method of claim 1, wherein the instruction that references the synchronization command is sequenced between the set-synchronization instruction and the synchronization point within the plurality of instructions.

7. The method of claim 5, wherein the instruction referenced by the program counter is subsequently executed.

8. A non-transitory computer-readable storage medium storing instructions that, when executed by a processor, cause a computing device to synchronize divergent executing threads, by performing the steps of:

receiving a plurality of instructions that includes at least one set-synchronization instruction that references a synchronization point within the plurality of instructions and at least one instruction that includes a synchronization command;

determining an active mask that indicates which threads in a plurality of threads are active and which threads in the plurality of threads are disabled;

for each instruction included in the plurality of instructions, transmitting the instruction to each of the active threads included in the plurality of threads;

when an instruction included in the plurality of instructions is a set-synchronization instruction that references a synchronization point within the plurality of instructions, then pushing onto a stack a synchronization token, the active mask and the synchronization point; and when an instruction included in the plurality of instructions is a predicated instruction that includes a synchronization command, then monitoring each active thread that executes the predicated instruction to determine when the active mask has been updated to indicate that each active thread, after executing the predicated instruction, has been disabled.

9. The non-transitory computer-readable storage medium of claim 8, wherein each instruction in the plurality of instructions corresponds to a different value of a program counter.

10. The non-transitory computer-readable storage medium of claim 9, wherein the program counter is incremented each time a different instruction is transmitted to the active threads.

11. The non-transitory computer-readable storage medium of claim 8, wherein, when the active mask indicates that all threads included in the plurality of threads are disabled, further comprising the step of popping the synchronization token, the active mask and the synchronization point from the stack.

12. The non-transitory computer-readable storage medium of claim 11, further comprising the steps of setting the active mask to the active mask popped from the stack, and setting the program counter to a value that references the synchronization point.

13. The non-transitory computer-readable storage medium of claim 8, wherein the instruction that references the synchronization command is sequenced between the set-synchronization instruction and the synchronization point within the plurality of instructions.

14. The non-transitory computer-readable storage medium of claim 8, wherein the instruction referenced by the program counter is subsequently executed.

15. A computing device configured to synchronize divergent executing threads, the computing device comprising:

a host processor coupled to a main memory; and a graphics adapter having an instruction unit, wherein the instruction unit is configured to:

receive a plurality of instructions that includes at least one set-synchronization instruction that references a synchronization point within the plurality of instructions and at least one instruction that includes a synchronization command;

determine an active mask that indicates which threads in a plurality of threads are active and which threads in the plurality of threads are disabled;

for each instruction included in the plurality of instructions, transmit the instruction to each of the active threads included in the plurality of threads; and when an instruction included in the plurality of instructions is a set-synchronization instruction that references a synchronization point within the plurality of instructions, then push onto a stack a synchronization token, the active mask and the synchronization point; and when an instruction included in the plurality of instructions is a predicated instruction that includes a synchronization command, then monitor each active thread that executes the predicated instruction to determine when the active mask has been updated to indicate that each active thread, after executing the predicated instruction, has been disabled.

16. The computing device of claim 15, wherein each instruction in the plurality of instructions corresponds to a different value of a program counter.

17. The computing device of claim 16, wherein the program counter is incremented each time a different instruction is transmitted to the active threads.

18. The computing device of claim 15, wherein, when the active mask indicates that all threads included in the plurality of threads are disabled, the computing device is further configured to pop the synchronization token, the active mask and the synchronization point from the stack.

19. The computing device of claim 18, further configured to set the active mask to the active mask popped from the stack, and setting the program counter to a value that references the synchronization point.

20. The computing device of claim 15, wherein the instruction that references the synchronization command is sequenced between the set- synchronization instruction and the synchronization point within the plurality of instructions.

21. The method of claim 1, wherein the active mask includes a flag for each thread included in the plurality of threads, and monitoring each active thread that executes the predicated instruction is performed by monitoring the flags associated with the active threads that execute the predicated instruction.

22. The method of claim 1, wherein the synchronization command causes each active thread to update a corresponding bit in the active mask to indicate that the active thread has been disabled after executing the predicated instruction.

* * * * *